United States Patent [19]
Lean et al.

[11] 3,791,715
[45] Feb. 12, 1974

[54] SYSTEM FOR COUPLING LIGHT FROM A FIBER OPTIC WAVEGUIDE INTO A THIN FILM WAVEGUIDE

[75] Inventors: Eric G. Lean, Mahopac; Keith S. Pennington, Somers, both of N.Y.

[73] Assignee: International Business Machines Corporation, Armonk, N.Y.

[22] Filed: Dec. 11, 1972

[21] Appl. No.: 314,204

[52] U.S. Cl. .......... 350/96 WG, 350/96 R, 350/161
[51] Int. Cl. .............................................. G02b 5/14
[58] Field of Search ...................... 350/96 WG, 161

[56] References Cited
UNITED STATES PATENTS

| | | |
|---|---|---|
| 3,584,230 | 6/1971 | Tien .................. 350/96 WG |
| 3,655,261 | 4/1972 | Chang ................ 350/96 WG |
| 3,674,337 | 7/1972 | Marcatili .............. 350/96 WG |

*Primary Examiner*—John K. Corbin
*Attorney, Agent, or Firm*—John J. Goodwin

[57] ABSTRACT

A coupler for optical guided waves is described which is electronically switchable and wherein light traveling in a fiber optic waveguide can be coupled into a thin film waveguide. The coupler consists of a substrate which in one embodiment is triangular in shape, with a thin film waveguide and an acoustic transducer on one surface thereof. The transducer is designed to produce an acoustic wave across the surface of the substrate and beneath the thin film waveguide. The output light from the optical fiber is introduced via a lens into a Fabry-Perot cavity formed by placing two high reflectivity mirrors located on the other two sides of the substrate. The light from the optical fiber is reflected back and forth in the cavity by being reflected from the surface on which the thin film is located. When the acoustic transducer is operated at the proper frequency, the light in the cavity is coupled into the thin film waveguide. Another embodiment is also shown wherein the fiber optic is connected directly into the substrate which is not triangular in shape.

6 Claims, 2 Drawing Figures

SYSTEM FOR COUPLING LIGHT FROM A FIBER OPTIC WAVEGUIDE INTO A THIN FILM WAVEGUIDE

BACKGROUND OF THE INVENTION

1. Field of the Invention

The present invention relates to the field of optics and more particularly to optical couplers for coupling optical waves from a fiber optic waveguide into a thin film waveguide.

2. Prior Art

Although optical couplers are known which employ substrates and acoustic waves to form couplers, the present invention is distinct from the prior art in that it teaches the combination of a Fabry-Perot cavity and a substrate for coupling light from an optical fiber into a thin film waveguide.

U. S. Pat. No. 3,674,335, filed May 25, 1970 and issued July 4, 1972, to A. Ashkin et al. and assigned to Bell Telephone Laboratories et al. is cited because it is an example of an apparatus for coupling light waves into an optical waveguide by means of an optical grating disposed along one surface of the guide.

The present invention is distinct from the cited patent and others of the same type in that the grating described in the patent is cut directly into the waveguide. In the present invention, a grating effect is produced by acoustic waves thereby making the device of the present invention switchable. Also, the cited patent does not couple light from an optical fiber and does not maintain the light in an optical cavity from which it can be switched into the waveguide.

SUMMARY OF THE INVENTION

An object of the present invention is to provide a coupler for optical guided waves which is electronically switchable and wherein light traveling in a fiber optic waveguide can be coupled into a thin film waveguide.

Another object of the present invention is to provide an optical coupler including a Fabry-Perot cavity.

A further object of the present invention is to provide an optical coupler wherein light from a fiber optic waveguide is introduced into a substrate via a lens and then coupled into a thin film waveguide.

Still another object of the present invention is to provide an optical coupler wherein light from a fiber optic waveguide is introduced directly into a substrate and then coupled into a thin film waveguide.

The foregoing and other objects, features and advantages of the invention will be apparent from the more particular description of the preferred embodiments of the invention, as illustrated in the accompanying drawings.

DESCRIPTION OF THE PREFERRED EMBODIMENTS

Figure 1:
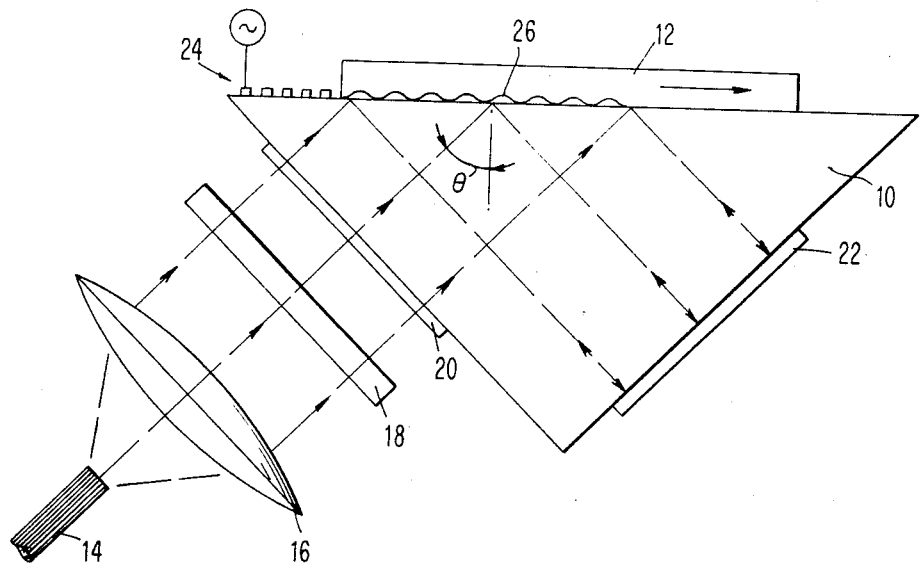
FIG. 1 is an illustration of an embodiment of the present invention wherein light from a fiber optic waveguide is introduced into a prismatic substrate via a lens and then coupled into a thin film waveguide by means of acoustic waves.

Referring to FIG. 1, one possible embodiment of a coupler for optical guided waves is shown. In FIG. 1, a transparent substrate prism 10 is provided having an index of refraction $n_s$. In the embodiment of FIG. 1, the prism 10 of crystal or other suitable material is shown triangular with a 90° angle at the bottom apex and the other two angles being 45° to facilitate cavity symmetry, however, other angles may be used. A thin dielectric film 12 is disposed on substrate 10 and functions as a waveguide. Thin film waveguide 12 has a thickness $t$ and an index of refraction $n_f$, where $n_f$ is greater than $n_s$.

An optical fiber 14 conducts light which emerges from one end thereof and is directed by a lens 16 through a mirror 18. Mirror 18 is a high reflectivity mirror on the side facing away from lens 16. Thus, mirror 18 may be a 99 percent reflectivity mirror which means it transmits 1 percent of the light from lens 16 and reflects 99 percent of the light on prism 10. The light from optical fiber 14 then is introduced into prism 10 as an incident beam through an anti-reflective coating 20. The light of the incident beam is then reflected from the upper surface of prism 10 onto a high reflectivity mirror 22. As thus far described, the incident beam is totally reflected from the upper surface of the prism 10 and mirrors 18 and 22 form a high Q Fabry-Perot cavity which sustains the light when tuned to the transmission frequencies, that is, the light is reflected back and forth within the cavity with high efficiency.

It was previously stated that the purpose of the present invention is to couple the light from optical fiber 14 into waveguide 12, and that the coupling be electronically switchable. The manner in which this is accomplished will now be described. An acoustic transducer 24 is located on the upper surface of prism 10. There are many different types of acoustic transducers and their function is to propagate an elastic acoustic wave on a surface. Various types of acoustic transducers and their theory of operation are described in the publication "Surface-Wave Electronics" by A. P. van den Heuvel, Science and Technology, Jan. 1969, pp. 52–60. An acoustic surface wave transducer is driven by a source of electronic signal, as is well known to those skilled in the art, therefore, such electronic driving source is assumed and is not shown in the FIGS. for purposes of clarity. When actuated, acoustic transducer propagates an acoustic wave which produces a periodic change in the index of refraction of thin film waveguide 12 which can be also considered a surface ripple in the interface between thin film waveguide 12 and prism 10. The periodic change in index of refraction is illustrated as ripple 26 having a periodicity represented by $\lambda$. It is emphasized that this periodic change in refraction index occurs only during the time when acoustic transducer 24 is switched on.

When the periodic change in index of refraction due to the acoustic wave occurs, there is no longer total internal reflection of the incident light beam and instead the light beam is coupled into thin film waveguide 12 and travels in the direction of the arrow shown on thin film 12.

The condition for coupling the light beam into thin film 12 is expressed as follows:

$$\sin \theta = \lambda/n_s(1/\lambda g - 1/\Lambda)$$

where $\theta$ is the angle between the incident light beam and the normal of the upper surface of prism 10, $\lambda$ is the optical wavelength in vacuum of the incident beam, $\lambda g$ is the guided optical wavelength and $\Lambda$, as previously mentioned, is the periodicity of the index of refraction produced by the acoustic wave.

Figure 2:
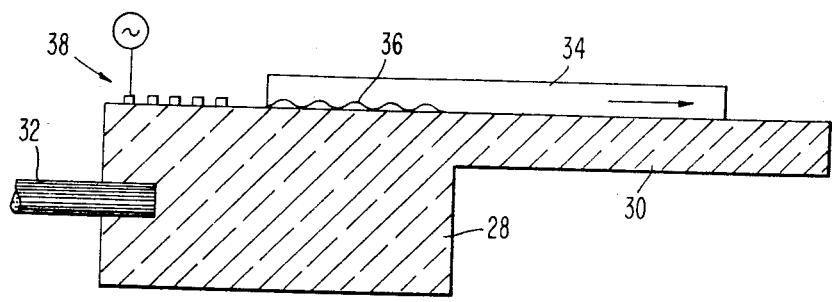
FIG. 2 is an illustration of another embodiment of the present invention wherein light from a fiber optic waveguide is introduced directly into a substrate and then coupled into a thin film waveguide by means of acoustic waves.

It is not necessary to the present invention that the substrate be triangular in shape or that the light from the optical fiber is introduced via a lens. FIG. 2 shows another embodiment of the present invention which can be used for coupling in which the high Q cavity 28 for the optical wave is integrated in the substrate 30. Cavity 28 will support many resonant modes depending on the shape and the size of the cavity. The optical fiber 32, which performs a function similar to that of a coaxial loop, can excite a mode in cavity 28 by properly placing optical fiber 32 in cavity 28 to match the field distribution of the cavity mode. The high Q cavity mode in cavity 28 can, in turn, excite the propagation mode in thin film waveguide 34 in which an acoustic wave 36 is propagated by switching on acoustic transducer 38. The optical fiber 32 is equivalent to optical fiber 14 described in relation to FIG. 1. Likewise, acoustic transducer 38 is equivalent to acoustic transducer 24 and their film waveguide 34 is equivalent to thin film waveguide 12.

What has been described is a unique apparatus for coupling light from an optical fiber into a thin film waveguide in an electronically switchable manner. A high Q optical cavity is disposed between the optical fiber and the thin film waveguide to support light modes. The light in the optical cavity can then be selectively coupled into the thin film waveguide by actuating an acoustic transducer which propagates acoustic surface waves which cause periodic changes in refraction index which effects the coupling of the light from the cavity into the thin film waveguide.

Since it is known that interaction between light waves and surface acoustic waves can be used to modulate the optical wave, one skilled in the art should be aware that the apparatus of the present invention can also be used for modulation as well as coupling.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for coupling light from an optical fiber into a thin film waveguide comprising an optically transparent dielectric substrate, said substrate having integrally formed therein an optical cavity for supporting light modes, an optical fiber for transmitting and introducing light into said optical cavity in said substrate, a thin film waveguide disposed on the surface of said substrate, an acoustic transducer means disposed on the same surface of said substrate as said thin film waveguide, said acoustic transducer means functioning to selectively propagate acoustic surface waves on said substrate surface to produce a periodic change of index of refraction of the interface between said substrate surface and said thin film waveguide to selectively couple said light in said optical cavity into said thin film waveguide.

2. An optical coupling apparatus according to claim 1 wherein said optically transparent dielectric substrate is a prism triangular in shape and wherein said light from said optical fiber enters through a first side of said substrate, is internally reflected from a second side of said substrate to said third side of said substrate, and is then reflected back from said third side of said substrate to said second side and then to said first side of said substrate to form said optical cavity in said substrate.

3. An optical coupling apparatus according to claim 2 wherein a first mirror element is located between said optical fiber and said first side of said substrate and a second mirror is located on said third side of said substrate, said first and second mirrors forming elements of an optical cavity for reflecting said light back and forth in said substrate.

4. An optical coupling apparatus according to claim 3 further including a lens element located between said optical fiber and said first mirror for directing a portion of said light from said optical fiber through said first mirror into said substrate.

5. An optical coupling apparatus according to claim 2 wherein the condition for coupling said light into said thin film is expressed as follows:

$$\sin \theta = \Lambda/n_s(1/\Lambda g - 1/\lambda)$$

where $\theta$ is the angle between the incident light and the normal of said second side of said dielectric substrate, $n_s$ is the index of refraction of said dielectric substrate, $\Lambda$ is the optical wavelength in vacuum of said incident light, $\Lambda g$ is the wavelength of the guided optical beam, and $\lambda$ is the periodicity of the index of refraction produced by said acoustic wave.

6. An optical coupling apparatus according to claim 1 wherein said optical fiber is directly physically connected into said dielectric substrate and wherein the dimensions of said substrate provide said optical cavity effect.

* * * * *

PO-1050
(5/69)

UNITED STATES PATENT OFFICE
CERTIFICATE OF CORRECTION

Patent No. 3,791,715            Dated    Feb. 12, 1974

Inventor(s) Eric G. Lean and Keith S. Pennington

It is certified that error appears in the above-identified patent and that said Letters Patent are hereby corrected as shown below:

Column 4, claim 5, after line 40 the formula should read
--$\sin \phi = \lambda/n_s (1/\lambda g - 1/\Lambda)$--.

Column 4, line 46, "$\Lambda$" should be --$\lambda$--.

Column 4, line 47, "$\Lambda g$" should be --$\lambda g$--.

Column 4, line 48, "$\lambda$" should be --$\Lambda$--.

Signed and sealed this 28th day of January 1975.

(SEAL)
Attest:

McCOY M. GIBSON JR.　　　　　　　　C. MARSHALL DANN
Attesting Officer　　　　　　　　　　Commissioner of Patents